(12) United States Patent
Rebelein et al.

(10) Patent No.: US 11,804,319 B2
(45) Date of Patent: Oct. 31, 2023

(54) ACTUATOR DEVICE AND METHOD FOR COMPENSATING FOR A STRAY MAGNETIC FIELD IN THE CASE OF AN ACTUATOR DEVICE

(71) Applicant: Vitesco Technologies Germany GMBH, Hannover (DE)

(72) Inventors: Andreas Rebelein, Neunkirchen a. Sand (DE); Joachim vom Dorp, Altdorf (DE)

(73) Assignee: Vitesco Technologies Germany GmbH, Hannover (DE)

(*) Notice: Subject to any disclaimer, the term of this patent is extended or adjusted under 35 U.S.C. 154(b) by 419 days.

(21) Appl. No.: 17/226,340

(22) Filed: Apr. 9, 2021

(65) Prior Publication Data
US 2021/0225572 A1 Jul. 22, 2021

Related U.S. Application Data

(63) Continuation of application No. PCT/EP2019/074266, filed on Sep. 11, 2019.

(30) Foreign Application Priority Data

Oct. 10, 2018 (DE) .......................... 102018217352.4

(51) Int. Cl.
*H01H 47/00* (2006.01)
*H01F 7/06* (2006.01)
(Continued)

(52) U.S. Cl.
CPC ............. *H01F 7/064* (2013.01); *G01D 3/032* (2013.01); *G05D 3/125* (2013.01); *G05D 3/20* (2013.01);
(Continued)

(58) Field of Classification Search
None
See application file for complete search history.

(56) References Cited

U.S. PATENT DOCUMENTS 5,465,012 A * 11/1995 Dunnam ................ H04B 15/00
361/139
6,020,737 A * 2/2000 Wyss ....................... G01B 7/30
324/225
(Continued)

FOREIGN PATENT DOCUMENTS

CN 85104623 A 12/1986
CN 1832877 A 9/2006
(Continued)

OTHER PUBLICATIONS

Japanese Office Action dated for corresponding Japanese Patent Application No. 2021-519788.
(Continued)

*Primary Examiner* — Stephen W Jackson

(57) ABSTRACT

An electromagnetic actuator device includes an actuator having an actuator coil and a tappet that can be moved in and against a longitudinal direction. The actuator device includes a sensor device having a transmitter element arranged on the tappet and a sensor element for generating a measurement signal, containing information about a current actual position of the tappet, depending on a magnetic field generated by the transmitter element. The actuator device includes a control unit with a controller, which applies a control voltage to the actuator coil for generating an electromagnetic field during operation in dependence on a position signal based on the measurement signal, so that the tappet moves into a target position. During operation, a stray magnetic field is generated by the at actuator coil, an
(Continued)

adaptation of the measurement signal is performed to compensate for the influence on the measurement signal caused by the stray field.

14 Claims, 1 Drawing Sheet

(51) Int. Cl.
    *G01D 3/032*     (2006.01)
    *G05D 3/12*     (2006.01)
    *G05D 3/20*     (2006.01)
    *H01F 7/08*     (2006.01)
    *H01F 7/16*     (2006.01)
    *G01D 5/14*     (2006.01)

(52) U.S. Cl.
    CPC ............... *H01F 7/081* (2013.01); *H01F 7/16* (2013.01); *G01D 5/145* (2013.01)

(56) References Cited

U.S. PATENT DOCUMENTS

| | | | |
|---|---|---|---|
| 7,030,519 | B2 | 4/2006 | Slettenmark |
| 8,847,582 | B2 | 9/2014 | Shestakov |
| 2007/0005216 | A1 | 1/2007 | Heinz |
| 2014/0084905 | A1* | 3/2014 | Shestakov ........... F15B 15/2861 |
| | | | 324/207.13 |
| 2015/0130388 | A1 | 5/2015 | Fukushima |
| 2017/0098988 | A1 | 4/2017 | Barbet |
| 2020/0249295 | A1* | 8/2020 | Punzo .............. G01R 33/56563 |

FOREIGN PATENT DOCUMENTS

| | | |
|---|---|---|
| CN | 104126268 A | 10/2014 |
| CN | 104272160 A | 1/2015 |
| CN | 105667577 A | 6/2016 |
| DE | 19706106 A1 | 8/1998 |
| DE | 19909109 A1 | 9/2000 |
| DE | 102013218708 A1 | 3/2014 |
| EP | 1422731 A1 | 5/2004 |
| JP | H05290345 A | 11/1993 |
| WO | 2013171998 A1 | 11/2013 |

OTHER PUBLICATIONS

Chinese Office Action dated Aug. 16, 2022 for corresponding Patent Application No. 201980066719.6.

International Search Report and Written Opinion dated Sep. 11, 2019 from corresponding International Patent Application No. PCT/EP2019/074266.

* cited by examiner

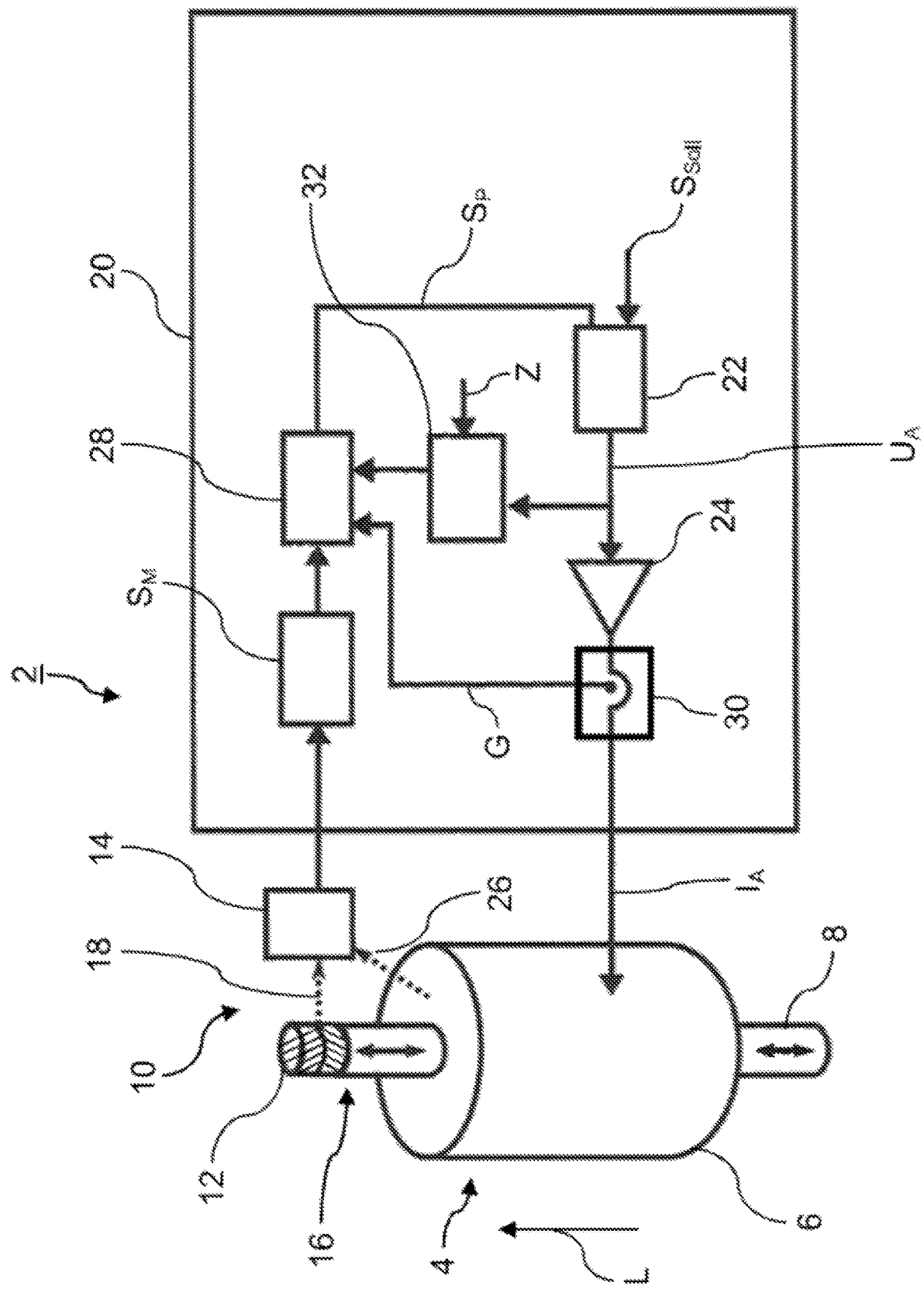

ACTUATOR DEVICE AND METHOD FOR COMPENSATING FOR A STRAY MAGNETIC FIELD IN THE CASE OF AN ACTUATOR DEVICE

CROSS-REFERENCE TO RELATED APPLICATIONS

This application claims the benefit of PCT Application PCT/EP2019/074266, filed Sep. 11, 2019, which claims priority to German Application DE 10 2018 217352.4, filed Oct. 10, 2018. The disclosures of the above applications are incorporated herein by reference.

TECHNICAL FIELD

The disclosure relates to an actuator device and to a method for compensating for a stray field in the case of such an actuator device.

BACKGROUND

Actuator devices, such as linear actuators, are nowadays used where, for example, a controlled and monitored linear movement along a longitudinal direction is required. For example, such linear actuators are used in the automotive industry in so-called "shift by wire" systems, in which they execute a linear movement for a gear change during operation.

Linear actuators usually have, in their simplest construction, an essentially pin-like tappet which is surrounded by a so-called actuator coil. The actuator coil is thus "wound around the tappet", with the formation of a gap between the actuator coil and the tappet. The functioning of the actuator is based on known electromagnetic considerations. During operation, a control voltage is in this case applied to the actuator coil and an electrical actuator current flowing within the actuator coil as a result of the control voltage generates an electromagnetic field in the vicinity of the actuator coil. The electromagnetic field generated exerts a force on the tappet, which as a result of the force moves in or against the longitudinal direction and thus executes the linear movement.

Such linear movements can usually be accurately controlled, for example by controlling the actuator current that is (indirectly) responsible for the linear movement (for example by controlling the actuator voltage). In order to obtain information about a current position of the tappet, such actuator devices usually have a position sensor. The position sensors are often designed in such a way that they also use a magnetic field (of their own, generated) to determine the position of the tappet. The disadvantage here is that the two fields (the electromagnetic field of the actuator coil and the magnetic field of the position sensor) can unwantedly influence one another.

SUMMARY

The disclosure specifies an actuator device in which magnetic field-related interferences are at least reduced.

The electromagnetic actuator device is designed as a linear actuator and is also referred to below as an actuator device for short.

The actuator device has an actuator with at least one actuator coil for generating at least one electromagnetic field. The actuator may have two actuator coils for generating two electromagnetic fields. Furthermore, the actuator has a tappet that can be moved in and against a longitudinal direction in dependence on the at least one generated magnetic field. The tappet is designed, for example, like a pin.

In addition, the actuator device has a sensor device having a transmitter element and a sensor element. The transmitter element is, in this case, arranged on the tappet. The sensor element is designed in such a way as to generate a measurement signal in dependence on a magnetic field generated by the transmitter element, which is detected by the sensor element during operation. The generated measurement signal in this case includes information about a current actual position of the tappet along the longitudinal direction. That is to say that, at different positions of the tappet, the sensor element detects different values (directions) of the magnetic field, on the basis of which different measurement signals are then generated.

Furthermore, the actuator device has a control unit with a controller, which is set up so as to apply a control voltage to the at least one actuator coil for generating the at least one electromagnetic field during operation in dependence on a position signal on the basis of the measurement signal. The position signal on the basis of the measurement signal is understood here as meaning that the actual position of the tappet can be deduced on the basis of the value of the measurement signal and is then transmitted to the controller in the form of the position signal. The application of the control voltage to the at least one actuator coil and the resultant generation of the at least one electromagnetic field are used to move the tappet, for example, to move the tappet from the current actual position into a (predetermined) target position.

During operation, an (unwanted) stray magnetic field, which (negatively) influences the measurement signal, and consequently also the position signal, is generated by the actuator coil.

The control unit includes a compensating device, which is set up so as to determine a variable correlated with the stray magnetic field (also called variable for short) and to adapt the measurement signal in dependence on this variable and transmit it to the controller. The adaptation of the measurement signal is performed in this case in such a way that the measurement signal is adapted on the basis of the determined variable so as to take into account the influence caused by the stray field, so that it is compensated for with respect to the measurement signal and consequently also the position signal.

This configuration is based on the consideration that—as already mentioned—in addition to the desired magnetic field, by means of which the position of the tappet is indirectly detected, the sensor device, in particular the sensor element, also detected by the sensor element is the stray magnetic field that occurs during operation of the actuator and is interferingly superposed on the desired magnetic field. That is to say that the magnetic field of the transmitter element is for example either unwantedly strengthened (by constructive superposition of the stray magnetic field and the magnetic field) or unwantedly weakened (by destructive superposition of the stray magnetic field and the magnetic field) by the stray magnetic field. In both cases of superpositioning, this leads to an influence on the measurement signal caused by the stray field, and consequently also on the position signal, and the controller thus receives incorrect information about the current actual position of the tappet. Positionally accurate control of the tappet position is negatively influenced by this.

By determining the variable correlated with the stray magnetic field by the compensating device and adapting the measurement signal in dependence on this variable, the undesired superposition of the stray magnetic field on the magnetic field is compensated for in such a way that a sufficiently accurate control of the position of the tappet is achieved. This compensates completely for the, in particular interfering, effect of the stray magnetic field.

In some implementations, the variable correlated with the stray magnetic field is an actuator current flowing in the at least one actuator coil as a result of the control voltage. This configuration is based on the physical consideration that the stray magnetic field generated is proportional to the actuator current flowing within the actuator coil. Furthermore, from a technical point of view, the detection of the actuator current may be implemented simply and inexpensively.

In some examples, also arranged in the control unit is an estimating unit, which is set up so as to determine the actuator current on the basis of at least one state variable of the actuator. This determination takes place, for example, when the actuator current cannot be measured or cannot be measured continuously.

In this case, the estimating unit may be set up so as to determine the actuator current on the basis of at least one or more of the following state variables:
the last detected actuator current,
the actuator temperature,
the electrical resistance of the at least one actuator coil,
the inductance of the at least one actuator coil,
the position and speed of the tappet and also
an actuator voltage (for example duty cycle+operating voltage in the case of PWM control).

The last detected actuator current is understood here as meaning, for example in the event of a temporary unavailability of the current measurement, the last measured current value at which the current measurement was still available.

The compensating device is expediently set up in such a way that it determines a correction variable (for example a correction value or a correction factor) from the determined variable on the basis of a correction function. On the basis of the correction variable, the measurement signal is then adapted during operation in such a way that the measurement signal has the correction variable applied to it, so that the influence caused by the stray field is taken into account. The correction function is in this case a function dependent on the actuator current for determining the correction variable. That is to say that, for different actuator currents occurring during operation, different correction variables for adapting the measurement signal are determined. As a result, it is possible to react to different actuator currents with regard to the adaptation of the measurement signal—and thus with regard to the compensation for the stray electromagnetic field interferingly superposed on the magnetic field. In addition, it is thereby achieved that the adaptation of the measurement signal is in each case performed with sufficient accuracy—regardless of the level of the actuator current flowing.

As an alternative to the determination of the correction variable on the basis of the correction function and the appropriate adaptation of the measurement signal, a functional assignment between actuator current values and a respective position of the tappet is stored in a table. This table is then stored for example in an internal memory of the control unit—in such a way that it can be called up during operation.

In some implementations, the correction variable determined on the basis of the correction function is corrected with calibrating values. The calibrating values may be, in this case, an offset and/or a gain factor.

This configuration has the advantage that effects due to the relationship between the magnetic field and the stray electromagnetic field and/or a gain error in the actuator current measurement are balanced by the offset or gain factor and the compensation is thereby advantageously influenced.

In some examples, the transmitter element is expediently designed as a permanent magnet. This achieves a particularly simple and inexpensive configuration of the transmitter element with regard to the generation of the magnetic field.

Furthermore, the sensor element may be expediently designed as a magnetic field sensor, for example as a (multi-axis) Hall sensor. Alternatively, the receiving unit may be designed as a magnetoresistive sensor. By designing the receiving unit as a magnetic field sensor, a particularly simple and inexpensive configuration of the sensor element is achieved—by analogy with the configuration of the transmitter element as a permanent magnet. In summary, the complete sensor device with the transmitter element and the sensor element is thus implemented simply and inexpensively.

In some implementations, the transmitter element is arranged on the tappet in such a way that the direction of the magnetic field generated by the transmitter element and the direction of the stray magnetic field at a measuring position at which the sensor element is arranged are essentially oriented in the same direction (thus resulting in a constructive superposition of the two fields). This configuration is based on the consideration that the directions of the stray magnetic field and the magnetic field are superposed in the form of vector addition to form a resulting field. In addition, the sensor element, designed for example as a Hall sensor or as a magnetoresistive sensor, requires a minimum value for the magnetic flux, so that an output signal, here the measurement signal, is generated. With the directions of the generated magnetic field and the stray magnetic field essentially oriented in the same direction, it is thus ensured on the one hand (by the magnitude of the resulting field) that a measurement signal is actually detected by the sensor element. Furthermore, an adaptation of the measurement signal for generating the position signal is thereby significantly simplified in comparison with a for example oppositely directed alignment of the directions of the two fields (the magnetic field and the stray magnetic field).

In some implementations, a method for compensating for a stray magnetic field in the case of an actuator device. The actuator device is in this case the actuator device already described above.

The advantages and examples listed with regard to the actuator device can be transferred accordingly to the method and vice versa.

The method is a method which is carried out by the actuator device described above. The method in this case includes the following steps:

First, a variable correlated with the stray magnetic field is detected by a compensating unit. The variable correlated with the stray magnetic field is in this case the actuator current flowing through the at least one actuator coil during operation.

A correction variable is then generated on the basis of the detected variable. The generation may take place here by a correction function in dependence on the detected variable.

An adaptation of the detected measurement signal is then performed by applying the generated correction variable to it.

The position signal is then generated on the basis of the adapted measurement signal and transmitted to the controller, so that a current actual position of the tappet is adapted by the position signal on the basis of the adapted measurement signal. The adaptation of the measurement signal thus compensates for the influence caused by the stray field and the tappet is thereby moved from the actual position into a predetermined target position, preferably without any deviations.

In some examples, a correction variable is determined by the compensating device from the determined variable on the basis of a correction function. The measurement signal is adapted on the basis of the correction variable, the correction variable determined on the basis of the correction function being corrected with calibrating values. The calibrating values may be in this case an offset and/or a gain factor.

In some implementations, for determining the calibrating values, the tappet is moved into predetermined and known calibrating positions. These known calibrating positions may be the two end positions of the tappet. The end positions are understood here in each case as meaning the position in and against the longitudinal direction that the tappet assumes in the event of maximum deflection.

The position of the tappet in the two end positions is determined once with an energized actuator, that is to say when the stray magnetic field is present, and once with a de-energized actuator, that is to say when the stray magnetic field is not present. This determination has the advantage that a deviation in the measurement signal, which contains information about the current actual position of the tappet, can be detected simply and accurately. That is to say that, by detecting the position of the tappet when the actuator is de-energized, there is no interfering stray field, so that the sensor device supplies an exact value of the position of the tappet. By detecting the measurement signal with the actuator energized, but with the position of the tappet unchanged, the measurement signal influenced by the stray field can be detected. A comparison of these two measurement signals thus provides a difference requiring compensation, that is to say the influence caused by the stray field.

In addition, a correction variable is then generated on the basis of the correction function and the correction variable is applied to the measurement signal, which is representative of the position of the tappet in one of the two end positions. A correction-function-related compensation for the aforementioned difference is thereby achieved. Finally, and by further addition, the measurement signal adapted by the correction function is compared once again with the measurement signal actually detected (that is to say determined when the actuator is not energized), and a possible offset and also the gain factor are determined from this.

Due to the fact that the two end positions, and thus the respective extreme position in and against the longitudinal direction of the tappet, were calibrated in such a way, the calibration for adapting the measurement signal may be applied to all positions of the tappet located between these two extreme positions.

The details of one or more implementations of the disclosure are set forth in the accompanying drawings and the description below. Other aspects, features, and advantages will be apparent from the description and drawings, and from the claims.

DESCRIPTION OF DRAWINGS

FIG. 1 shows an actuator device with an actuator and a control unit.

Like reference symbols in the various drawings indicate like elements.

DETAILED DESCRIPTION

The electromagnetic actuator device 2, for the sake of simplicity also referred to hereinafter as the actuator device 2 for short, has an actuator 4. The actuator 4 has at least one actuator coil 6 for generating at least one electromagnetic field. Furthermore, the actuator 4 has a tappet 8, which can be moved in and against a longitudinal direction L in dependence on the at least one generated electromagnetic field. In some examples, the tappet 8 is designed like a pin.

In addition, the actuator device 2 has a sensor device 10. The sensor device 10 has a transmitter element 12 and a sensor element 14. In some examples, the transmitter element 12 is arranged on the tappet 8. The transmitter element 12 may be specifically arranged at an upper end 16 of the tappet 8. The sensor element 14 is designed so as to generate a measurement signal $S_M$ in dependence on a magnetic field 18 generated by the transmitter element 12. The measurement signal $S_M$ contains information about a current actual position of the tappet 8 along the longitudinal direction L. In some examples, the transmitter element 12 is designed as a permanent magnet. Furthermore, the sensor element 14 may be designed as a Hall sensor.

Furthermore, the actuator device 2 has a control unit 20. The control unit 20 has a controller 22. The controller 22 is set up in such a way that, during operation, dependent on a position signal $S_P$ on the basis of the measurement signal $S_M$, a control voltage $U_A$ is applied to the at least one actuator coil 6 to generate the at least one electromagnetic field. For this purpose, the controller 22 is connected for example by a power driver 24, e.g. a voltage source, so that the control voltage $U_A$ may be provided. The control unit 20 makes it possible to move the tappet 8 from a momentary actual position into a predetermined target position, for example in the form of a signal $S_{Target}$. The target position is in this case for example transmitted to the controller 22 as an input variable.

During the operation of the actuator device 2, a stray magnetic field 26 is generated by the actuator coil 6. This influences the measurement signal $S_M$ to the extent that a positionally accurate control of the actual position into the target position is affected by errors.

In order to compensate for being affected by errors in this way, in the control unit 20 includes a compensating device 28. The compensating device 28 is set up so as to determine a variable G correlated with the stray magnetic field 26 and to adapt the measurement signal $S_M$ in dependence on this variable and to transmit it to the controller 22. In some examples, an actuator current $I_A$ flowing in the at least one actuator coil 6 as a result of the control voltage is used as the variable G correlated with the stray magnetic field 26. The adaptation of the measurement signal $S_M$ is performed in such a way as to compensate for the influence of the measurement signal $S_M$ caused by the stray field. That is to say that, on account of the compensation by the compensating device 28, the controller 22 receives a position signal $S_P$ on the basis of the measurement signal $S_M$, which is not influenced by the stray magnetic field 26. In other words, there is a position signal $S_P$ on the basis of the measurement signal $S_M$, as if there were no interfering stray magnetic field 26.

The measurement of the variable G correlated with the stray magnetic field 26, i.e., the armature current $I_A$, takes place for example by a current measuring unit 30, which is additionally connected to the compensating unit 28 for transmitting the armature current $I_A$.

If the direct determination of the variable G correlated with the stray magnetic field 26 cannot be detected, or temporarily cannot be detected, the control unit 20 has an estimating unit 32. The estimating unit 32 is set up in such a way that the variable G correlated with the stray magnetic field 26 is determined on the basis of other state variables Z of the actuator 4. In some examples, these other state variables Z are also in a correlation with the armature current $I_A$, and thus also in a correlation with the stray magnetic field 26. The other state variables are thus for example the last measured armature current $I_A$, the control voltage $U_A$, an actuator temperature, a measured or estimated electrical resistance and/or a measured or estimated inductance of the at least one actuator coil 6 and for example an approximate position and/or speed of the tappet 8.

A number of implementations have been described. Nevertheless, it will be understood that various modifications may be made without departing from the spirit and scope of the disclosure. Accordingly, other implementations are within the scope of the following claims.

LIST OF REFERENCE SIGNS

2 Electromagnetic actuator device
4 Actuator
6 Actuator coil
8 Tappet
10 Sensor device
12 Transmitter element
14 Sensor element
16 Upper end
18 Magnetic field
20 Control unit
22 Controller
24 Power driver
26 Stray magnetic field
28 Compensating device
30 Current measurement unit
32 Estimating unit
L Longitudinal direction
$S_M$ Measurement signal
$S_{Target}$ Target position signal
$S_P$ Position signal
$I_A$ Armature current
G Variable
$U_A$ Control voltage
Z State variable

What is claimed is:

1. An electromagnetic actuator device comprising:
   an actuator with at least one actuator coil for generating at least one electromagnetic field and with a tappet movable in and against a longitudinal direction in dependence on the at least one generated electromagnetic field;
   a sensor device comprising a transmitter element and a sensor element, the transmitter element arranged on the tappet, the sensor element designed to generate a measurement signal, which contains information about a current actual position of the tappet along the longitudinal direction, in dependence on a magnetic field generated by the transmitter element; and
   a control unit with a controller, which is set up so as to apply a control voltage to the at least one actuator coil for generating the at least one electromagnetic field during operation in dependence on a position signal on the basis of the measurement signal, so that the tappet moves from the current actual position into a target position,
   wherein during operation, a stray magnetic field, which influences the measurement signal, is generated by the at least one actuator coil, and wherein the control unit has a compensating device, which is set up so as to determine a variable correlated with the stray magnetic field and to adapt the measurement signal in dependence on this variable and transmit it to the controller, the adaptation of the measurement signal performed in such a way as to compensate for the influence of the measurement signal caused by the stray field.

2. The actuator device as claimed in claim 1 comprising a linear actuator.

3. The actuator device as claimed in claim 1,
   wherein the variable correlated with the stray magnetic field is an actuator current flowing in the at least one actuator coil as a result of the control voltage.

4. The actuator device as claimed in claim 3,
   wherein an estimating unit is arranged in the control unit is, the estimating unit is set up so as to determine the variable correlated with the stray magnetic field on the basis of at least one state variable of the actuator.

5. The actuator device as claimed in claim 4,
   wherein the estimating unit determines the variable correlated with the stray magnetic field on the basis of at least one of the following state variables:
   the last detected actuator current,
   the actuator temperature,
   the electrical resistance of the at least one actuator coil,
   the inductance of the at least one actuator coil,
   the position and speed of the tappet,
   the control voltage of the actuator.

6. The actuator device as claimed in claim 1,
   wherein the compensating device is set up in such a way that it determines a correction variable from the determined variable on the basis of a correction function and adapts the measurement signal on the basis of the correction variable.

7. The actuator device as claimed in claim 6,
   wherein the correction variable determined on the basis of the correction function is corrected with calibrating values, the calibrating values being an offset and/or a gain factor.

8. The actuator device as claimed in claim 1,
   wherein the transmitter element is designed as a permanent magnet.

9. The actuator device as claimed in claim 1,
   wherein the sensor element is designed as a magnetic field sensor.

10. The actuator device as claimed in claim 1,
    wherein the transmitter element is arranged on the tappet in such a way that the direction of the magnetic field generated by the transmitter element and the direction of the stray magnetic field at a measuring position at which the sensor element is arranged are oriented in the same direction.

11. A method for compensating for a stray magnetic field of an actuator device, the actuator device comprising:
    an actuator with at least one actuator coil for generating at least one electromagnetic field and with a tappet movable in and against a longitudinal direction in dependence on the at least one generated magnetic field,
    a sensor device comprising a transmitter element and a sensor element, the transmitter element arranged on the tappet and a measurement signal, which contains information about a current actual position of the tappet along the longitudinal direction, being generated by the sensor element in dependence on a magnetic field generated by the transmitter element, and a control unit with a controller, by which a control voltage is applied to the at least one actuator coil for generating the at least one electromagnetic field in dependence on a position signal on the basis of the measurement signal, so that the tappet is moved from the current actual position into a target position and wherein a stray magnetic field, which influences the measurement signal, is generated by the at least one actuator coil, comprising the following steps:

detecting a variable correlated with the stray magnetic field by a compensating device, generating a correction variable on the basis of the detected variable, adapting the measurement signal by applying the correction variable to the measurement signal, and transmitting the position signal on the basis of the adapted measurement signal to the controller.

12. The method of claim 11,
in which a correction variable is determined by the compensating device from the determined variable on the basis of a correction function and the measurement signal is adapted on the basis of the correction variable and wherein the correction variable determined on the basis of the correction function is corrected with calibrating values, the calibrating values being an offset and/or a gain factor.

13. The method as claimed in claim 12,
in which, to determine the calibrating values, the tappet is moved into predetermined and known calibrating positions once with an energized actuator and once with a de-energized actuator, and the position of the tappet is detected in each case by the sensor device and the value for the calibrating position determined for a respective calibrating position by the correction function is compared with the actual value of the calibrating position and the offset and gain factor are determined from this.

14. The method of claim 13, wherein the predetermined and known calibrating positions include the two end positions.

* * * * *